(12) United States Patent
Iwasaki

(10) Patent No.: US 7,023,446 B1
(45) Date of Patent: Apr. 4, 2006

(54) PRESENTATION OF IMAGES RESEMBLING EACH OTHER

(75) Inventor: Masajiro Iwasaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 555 days.

(21) Appl. No.: 09/559,255

(22) Filed: Apr. 27, 2000

(30) Foreign Application Priority Data

Apr. 28, 1999 (JP) ................................. 11-120946

(51) Int. Cl.
*G09G 5/00* (2006.01)
(52) U.S. Cl. ..................................................... 345/581
(58) Field of Classification Search ................ 345/581; 382/190, 216, 305
See application file for complete search history.

(56) References Cited

U.S. PATENT DOCUMENTS

| 5,933,823 | A | * | 8/1999 | Cullen et al. | ................... | 707/6 |
| 6,121,969 | A | * | 9/2000 | Jain et al. | ................... | 345/850 |
| 6,240,423 | B1 | * | 5/2001 | Hirata | ..................... | 707/104.1 |
| 6,269,358 | B1 | * | 7/2001 | Hirata | ........................... | 707/1 |
| 6,400,853 | B1 | * | 6/2002 | Shiiyama | .................... | 382/305 |

* cited by examiner

*Primary Examiner*—Amr A. Awad
*Assistant Examiner*—Motilewa Good-Johnson
(74) *Attorney, Agent, or Firm*—Dickstein Shapiro Morin & Oshinsky LLP

(57) ABSTRACT

A method of displaying images that resemble each other includes the steps of extracting image features from images, dividing a feature space of the image features into sub-spaces having a hierarchical structure, generating a tree structure having the sub-spaces as nodes thereof, dividing a display space into divided spaces reflecting the tree structure, and assigning the images to the corresponding divided spaces so as to display the images arranged in the display space.

18 Claims, 11 Drawing Sheets

SELECTED DIMENSION

PRESENTATION OF IMAGES RESEMBLING EACH OTHER

BACKGROUND OF THE INVENTION

1. Field of the Invention

The present invention generally relates to a method of displaying a plurality of images that are similar to each other, and relates to a memory medium having a program embodied therein for displaying such a plurality of images.

2. Description of the Related Art

An increase in CPU speed together with increases in memory volumes of main/secondary memory devices have made it easier to treat image data. Further, widespread use of the Internet and digital cameras or the like have made it possible to transfer image data to personal computers or the like quite easily, resulting in a large volume of image data flooding around us in everyday life. Against this background, there is a need for a scheme that allows a user to search for a desired image from a massive amount of image data.

A conventional scheme for image search typically conducts a search by using attribute information after manually attaching the attribute information to images. This scheme, however, cannot cope with a rapid increase of image data. In recent years, an effort has been directed to a study on a scheme that automatically extracts image features such as color histograms, textures, and shapes from image data, and searches for an image resembling a specified image by using the extracted image features. This study has proven to be a success.

Such image search schemes include a scheme that extracts image features from images in advance, and extracts image features from an image specified as a search key, followed by comparing the image features of the specified image with the image features of other images to find resembling images. This scheme can show a reasonably good performance when the number of image features is small, but suffers a decrease in processing speed as the number of image features increases.

In terms of graphical interface, a typical image search system presents search-result images by arranging them in a row in a descending order of similarity. This kind of display lacks presentation of relationships between images that are gauged quantitatively at an image pattern level. Similarity measures of images may not reflect the user's intention of his/her search, so that the search results are merely one of the factors to be used in the user's decision making. There is a need, therefore, for interface that can assist a user to organize the search results. In particular, a resembling image search is, by its definition, conducted with ambiguity existing in the user's search request, and the user tends to try and see as many images as possible. In such a situation, many search results need to be presented to the user.

In consideration of this, an interface that presents to the user as many search results as possible and asks for the user's judgment is disclosed in "A User Interface Visualizing Feature Space for Content-Based Image Retrieval," Technical Report of IEICE, IE98-204. This interface presents a complete listing of search results in such an organized fashion as to allow a user to intuitively understand underlining treads of the search results. In detail, images obtained as search results are subjected to principal component analysis, and image features obtained by the analysis are mapped into a 2-dimensinal-display space to present the search results. Since the principal component analysis is applied only to the search-result images rather than to all the images of the database, the number of feature dimensions is significantly lower, achieving compression of information. Further, the search-result images can be presented by more accurately reflecting a nature of image-set distribution and by more widely spreading the search-result images, thereby allowing the user to grasp underlining treads of the search-result images.

In the field of a relating endeavor, a visual interaction scheme is disclosed in "Visual Interaction for Exploration in Information Space of Documents," Journal of JSSST, Vol. 13. This scheme introduces an idea of dynamic updating of visualized results in a visual classification technique where the updating is performed in response to a user operation, and the visual classification is given by arranging a large number of documents and keywords based on their mutual relationships. Presentation of search results in this visual interaction scheme arranges documents close to each other in a 2-dimensional or 3-dimensinal space if these documents resemble each other according to the similarity measure of the documents. Such a similarity measure is obtained, for example, by using indexes.

The scheme disclosed in "A User Interface Visualizing Feature Space for Content-Based Image Retrieval," Technical Report of IEICE, IE98-204 has a problem in that principal analysis cannot be carried out when image features cannot be represented by vector data or when image similarity between images cannot be represented by a linear function.

The scheme disclosed in "Visual Interaction for Exploration in Information Space of Documents," Journal of JSSST, Vol. 13 has a drawback in that a large amount of computation becomes necessary when the number of keywords becomes large, which makes a processing time lengthy, thereby making it difficult for a user to grasp a nature of the interactively presented visual information.

Accordingly, there is a need for a resembling image search scheme that can display search-result images at high speed according to similarity measures obtained in a feature space even when image features cannot be represented by vector data or even when image similarity cannot be represented by a linear function.

SUMMARY OF THE INVENTION

Accordingly, it is a general object of the present invention to provide a resembling image search scheme which satisfies the need described above.

It is another and more specific object of the present invention to provide a resembling image search scheme that can display search-result images at high speed according to similarity measures obtained in a feature space even when image features cannot be represented by vector data or even when image similarity cannot be represented by a linear function.

In order to achieve the above objects according to the present invention, a method of displaying images that resemble each other includes the steps of extracting image features from images, dividing a feature space of the image features into sub-spaces having a hierarchical structure, generating a tree structure having the sub-spaces as nodes thereof, dividing a display space into divided spaces reflecting the tree structure, and assigning the images to the corresponding divided spaces so as to display the images arranged in the display space.

In the invention described above, image features are positioned in the display space in such a manner as to reflect relative special relations in the feature space. This ensures that images resembling each other are displayed close to each other on the display screen. Further, the images can be displayed at high speed according to similarity measures obtained in a feature space even when image features cannot be represented by vector data or even when image similarity cannot be represented by a linear function.

According to one aspect of the present invention, the method described above is such that the step of dividing a feature space includes a step of generating clusters having a circle shape by applying a clustering method recursively.

In the invention described above, use of a clustering method reduces the amount of data processing, thereby shortening the processing time.

According to another aspect of the present invention, the method as described above is such that the clustering method includes the steps of obtaining a distance between an image feature and one of the clusters closest to the image feature with respect to each one of the image features, selecting an image feature successively from the image features in an ascending order of the distance, obtaining an increase in a radius of each cluster such that said each cluster contains the selected image feature, and making the selected image feature belong to a cluster that has the smallest radius increase.

In the invention described above, more accurate clustering can be achieved.

According to another aspect of the present invention, the method as described above is such that the step of dividing the display space includes the steps of a) dividing the display space in a direction of a selected dimension selected for a given node of the tree structure into divided spaces as many as there are nodes immediately under the given node in the tree structure, and b) repeating the step a) by changing the selected dimension as a new node is selected as the given node from a next node level.

In the invention described above, the divided display spaces correspond to the respective nodes, and have the respective images representing the nodes. Images that resemble each other are positioned close to each other.

According to another aspect of the present invention, the method as described above is such that the step a) further provides extra spaces between the divided spaces such that the extra spaces represent gaps between the nodes.

In the invention described above, a display screen is obtained such that an arrangement of images reflects similarity measures more accurately.

According to another aspect of the present invention, the method as described above is such that the step a) divides the display space such that the divided spaces corresponding to the respective nodes have sizes proportional to numbers of image features belonging to the respective nodes.

In the invention described above, images tend to be evenly distributed over the display space, thereby avoiding excessive concentration of images in a given small space and ensuring image display that is easy to see.

According to another aspect of the present invention, the method as described above is such that the step a) divides the display space such that the divided spaces corresponding to the respective nodes have sizes proportional to sizes of the sub-spaces corresponding to the respective nodes.

In the invention described above, a display screen is obtained such that an arrangement of images reflects similarity measures more accurately.

According to another aspect of the present invention, the method as described above further includes a step of adjusting sizes of the divided spaces such that the sizes of the divided spaces corresponding to the respective nodes reflect numbers of image features belonging to the respective nodes and sizes of the sub-spaces corresponding to the respective nodes.

In the invention described above, a display screen is obtained such that an arrangement of images reflects similarity measures more accurately.

Other objects and further features of the present invention will be apparent from the following detailed description when read in conjunction with the accompanying drawings.

DESCRIPTION OF THE PREFERRED EMBODIMENTS

In the following, an embodiment of the present invention will be described with reference to the accompanying drawings.

Figure 1:
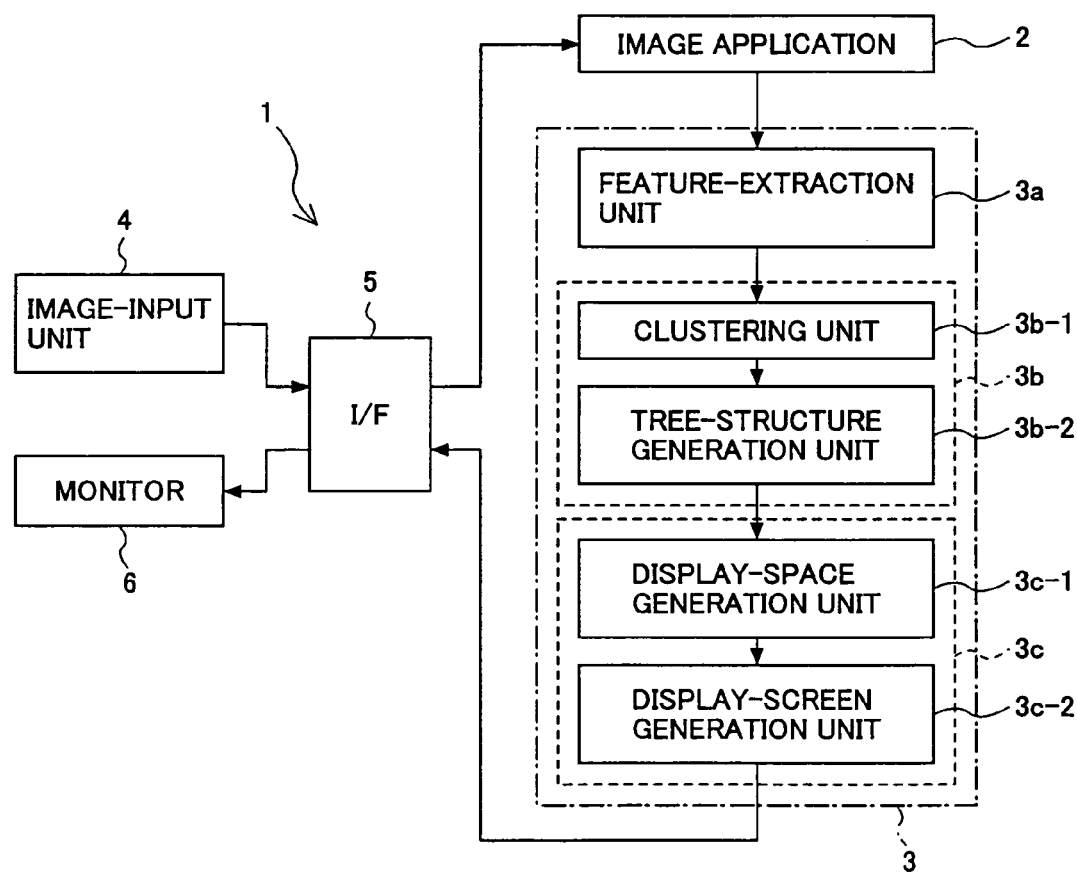
FIG. 1 is a block diagram showing a configuration of a resembling image search device.

FIG. 1 is a block diagram showing a configuration of a resembling image search device 1.

As shown in FIG. 1, the resembling image search device 1 includes an image application 2 and a resembling image search/display unit 3. The image application 2 is used for storing and managing image data, and is connected to an image input unit 4 via an interface unit 5. The image input unit 4 may be a scanner or a digital camera, so that image data input to the image input unit 4 is supplied to the image application 2. The image input unit 4 may be a connection to a network, so that image data downloaded from a Web site is supplied to the image application 2.

The resembling image search/display unit 3 of the resembling image search device 1 is connected to a monitor 6 via the interface unit 5. The resembling image search device 1 is implemented by using hardware and software. The hardware includes a computer comprised of a CPU, a ROM, a RAM, and the like, a hard-drive, a CD-ROM drive, etc, as will be described later with reference to FIG. 11. The software includes system software such as an operation system for controlling the hardware resources, and includes application programs for carrying out various processing by using the hardware resources. The application programs are stored in computer-readable record media such as CD-ROMs, and are loaded to the computer via the CD-ROM driver or the like.

In the following, the resembling image search/display unit 3 will be described. The resembling image search/display unit 3 includes a feature extraction unit 3a, a feature-space tree-structure extraction unit 3b, and an image display processing unit 3c.

The feature extraction unit 3a will be described first.

Features suitable for representing image characteristics include histogram features, edge features, texture features, etc. In the following, a description will be given with reference to a case in which the histogram features are extracted. To extract histogram features, a proper color space (Lab, Luv, HSV, etc., for example) is first selected, and is divided into a plurality of areas. Then, the number of pixels is counted in each area while checking which pixels belong to which area of the color space, followed by normalizing the number of pixels in each area by the total number of pixels. This normalized number of pixels in each area constitutes the histogram features. A distance between two histogram features may be obtained by calculating a difference of pixel counts between an area of one histogram feature and a corresponding area of the other histogram feature and by obtaining a sum of the pixel-count differences for all the areas. Alternatively, a Euclidean distance based on the pixel counts may be obtained.

The feature-space tree-structure extraction unit 3b will be described in the following.

The feature-space tree-structure extraction unit 3b includes a clustering unit 3b-1 and a tree-structure generation unit 3b-2. The clustering unit 3b-1 divides a feature space into a plurality of sub-spaces (clusters) where the feature space is comprised of features. Clustering may be carried out by employing a Nearest Neighbor method, a K-average algorithm, or any other method that is known in the art.

Figure 2:
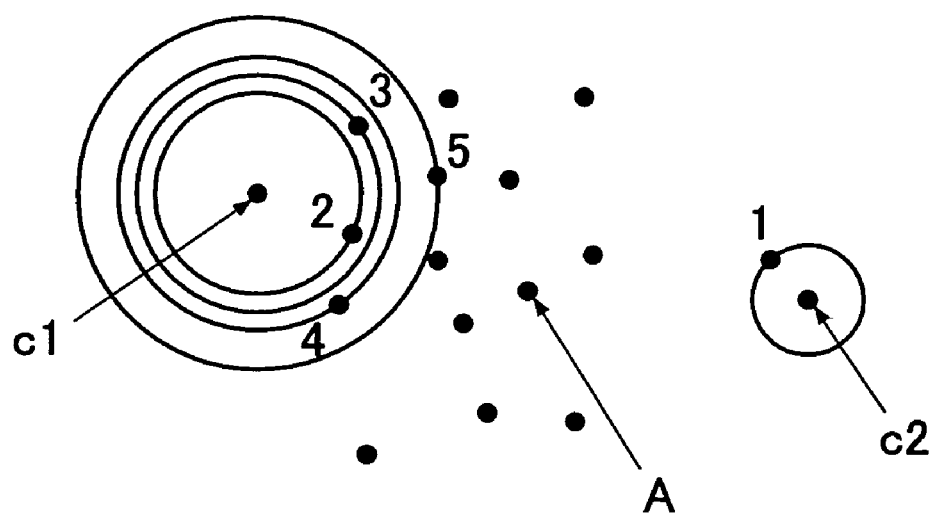
FIG. 2 is an illustrative drawing for explaining a clustering process.

FIG. 2 is an illustrative drawing for explaining a clustering process. The clustering process will be described below with reference to FIG. 2.

1. Selecting of Center Features of Clusters
   a) Select a feature A in a feature space.
   b) Select a feature farthest away from the feature A and designate the selected feature as a center feature c1 of a cluster.
   c) Select a feature farthest away from the center feature c1 and designate the selected feature as a center feature c2 of a second cluster.
   d) Select a feature far away from either one of the selected center features and designate the selected feature as a center feature of a new cluster.
   e) Repeat the step d) to obtain center features as many as clusters are necessary.

2. Sorting of Features
   a) Select a feature P in the feature space.
   b) Obtain a distance between the feature P and each of the center features and select the smallest distance as a cluster distance.
   c) Repeat the steps a) and b) to obtain cluster distances for features P (P=1, 2, 3, . . . n).
   d) Sort the cluster distances of the features P in an ascending order.

3. Distribution of Features
   a) Select zero as a radius of each cluster.
   b) Perform the following process on the features P successively in an ascending order of the cluster distance. Increase a radius of each cluster such that the currently processed feature P is included within the increased radius of each cluster, and select a cluster having the smallest radius increase as a cluster to which the currently processed feature P belongs.
   c) Repeat the step b) for all the features P (P=1, 2, 3, . . . , n).

The procedure described above is followed to perform the clustering process. Since a radius increase of a cluster is small with respect to features forming a dense crowd as shown in FIG. 2, these features tend to be grouped into one cluster.

The tree-structure generation unit 3b-2 of the feature-space tree-structure extraction unit 3b will be described below.

The tree-structure generation unit 3b-2 performs a tree-structure generation process to make branches of a tree structure by treating clusters as nodes of the tree structure where the clusters are obtained by dividing the feature space into sub-spaces through the clustering process. The tree-structure generation process further clusters each cluster into sub-clusters in much the same manner as described above, and treats the sub-clusters as nodes of the tree structure. This clustering and branching process is repeated in a recursive fashion, thereby generating a tree-structure of a feature space.

Figure 3:
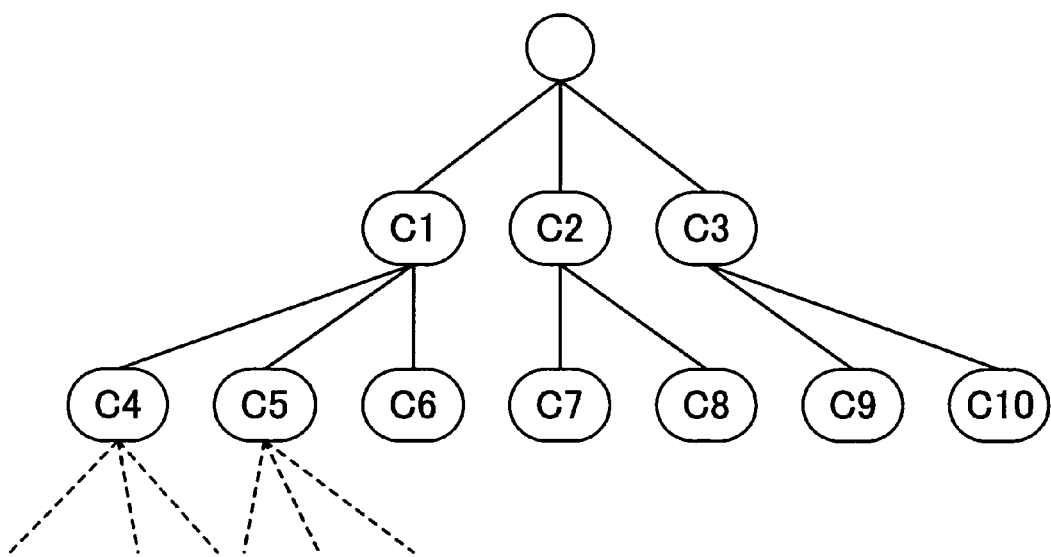
FIG. 3 is an illustrative drawing showing a tree structure of a feature space.

FIG. 3 is an illustrative drawing showing a tree structure of a feature space.

After the completion of the tree-structure generation process, all features belong to respective leaf nodes that are at the lowest level in the hierarchy. Clusters organized into a tree structure in this manner each have a representative image that represents the cluster. Also, in this tree structure, features resembling each other are arranged close to each other.

Figure 4:
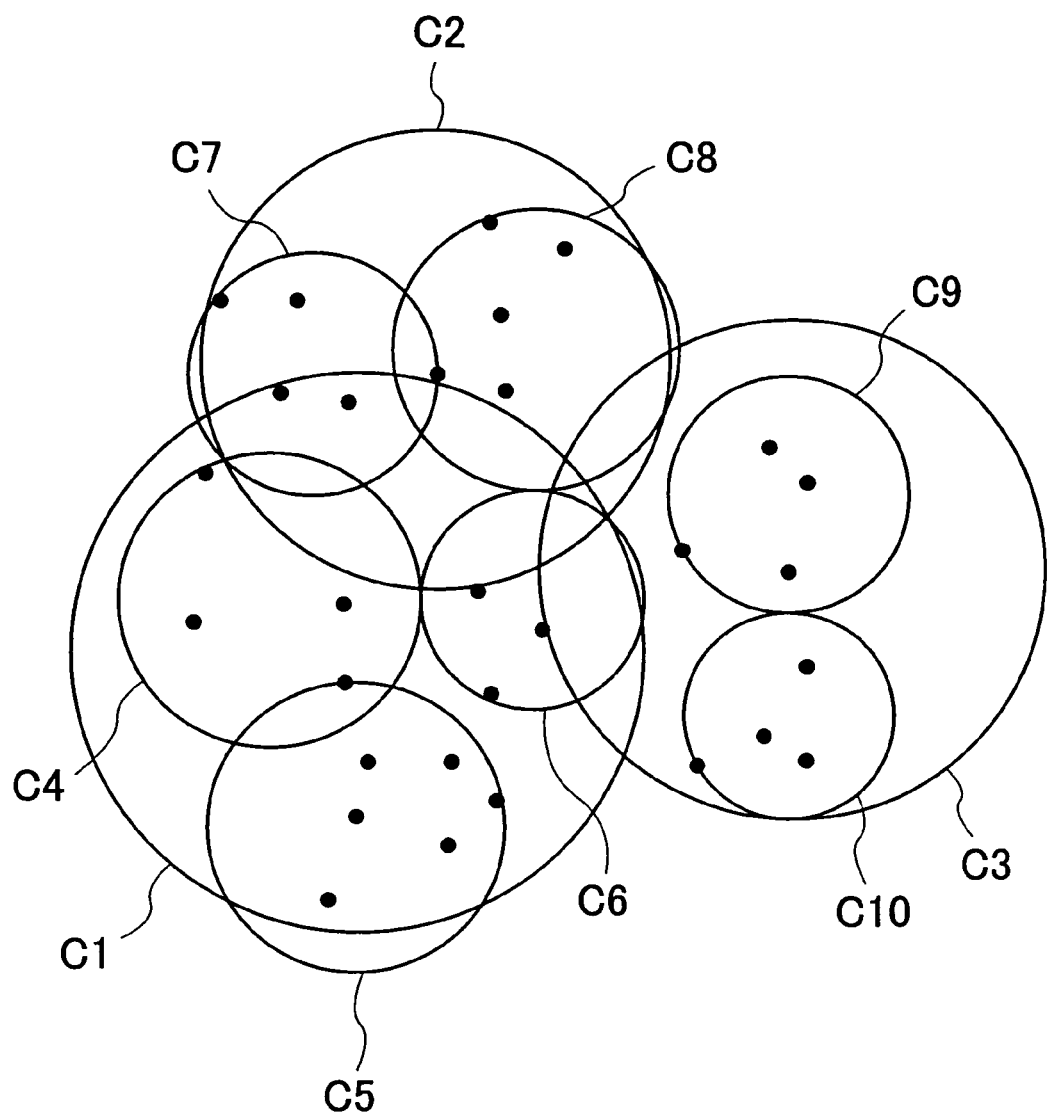
FIG. 4 is an illustrative drawing showing a 2-dimensional presentation of an example of the feature space.
Figure 5:
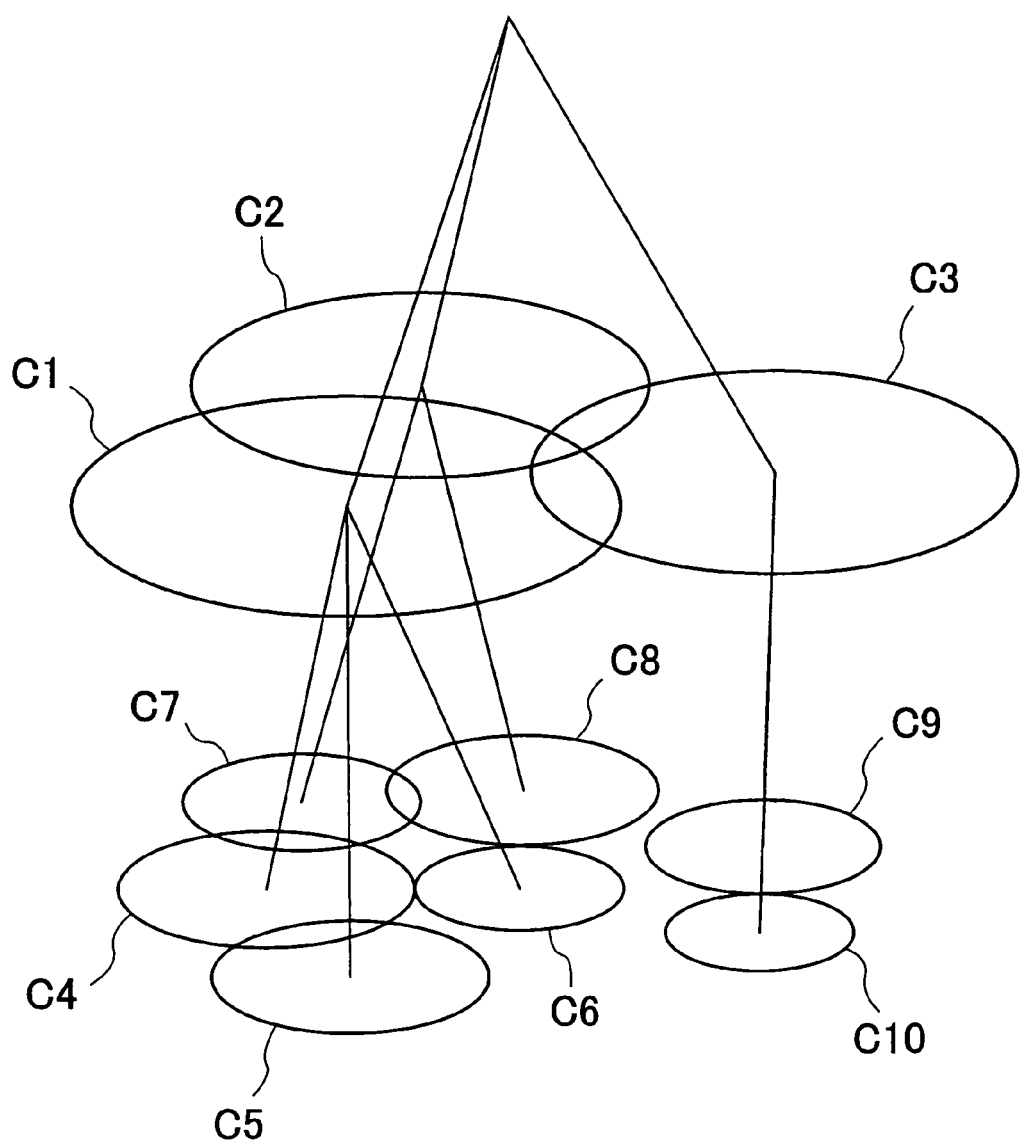
FIG. 5 is an illustrative drawing showing a 3-dimensional presentation of an example of the feature space.

FIG. 4 is an illustrative drawing showing a 2-dimensional presentation of an example of a feature space. FIG. 5 is an illustrative drawing showing a 3-dimensional presentation of an example of a feature space.

As shown in FIG. 4 and FIG. 5, each cluster including images similar to each other is comprised of a node of an upper-level cluster (C1, C2, C3) and child nodes of lower-level clusters (C4 through C10). Each node includes at least one child node.

In the following, the image display processing unit 3c will be described.

The image display processing unit 3c includes a display-space generation unit 3c-1 and a display-screen generation unit 3c-2. The display-space generation unit 3c-1 performs a display-space generation process.

Figure 6A:
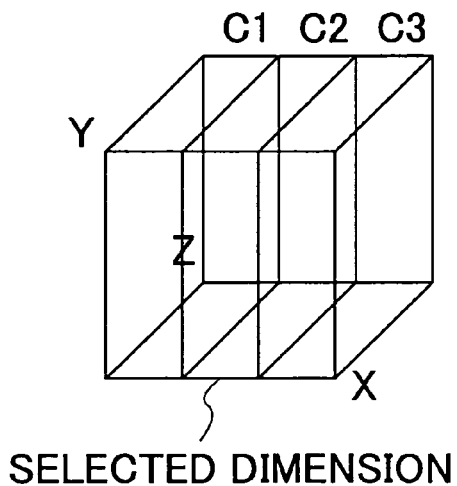
FIGS. 6A through 6C are illustrative drawings for explaining a display-space generation process.
Figure 6B:
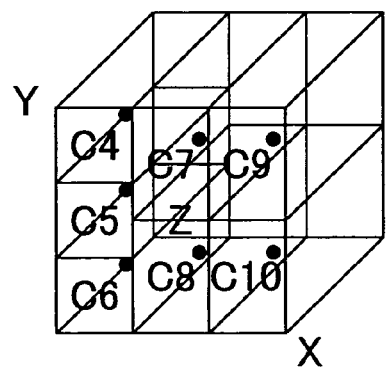
Figure 6C:
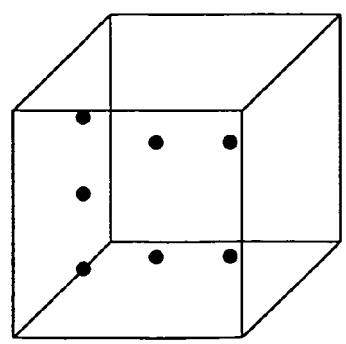

FIGS. 6A through 6C are illustrative drawings for explaining the display-space generation process. In this embodiment, a three-dimensional space is used as a space onto which a tree-structure is mapped.

In the following, the display-space generation process will be described with reference to FIGS. 6A through 6C.
   a) Select one dimension of a display space that is a space for visually presenting images, and divide the display space evenly in the direction of the selected dimension so as to have as many divided spaces as there are branches leading to next-level nodes (C1, C2, C3) in the tree structure (FIG. 6A).
   b) Assign the nodes (C1, C2, C3) to the respective divided spaces (FIG. 6A). Here, the nodes are positioned close to each other when these nodes have similar features.
   c) Repeat the steps a) and b) for child nodes (C4 though C10) by selecting a different dimension.

A recursive process as described above maps all the nodes of the tree structure onto the display space as shown in FIG. 6B and FIG. 6C. This ends the display-space generation process.

In what follows, the display-screen generation unit 3c-2 of the image display processing unit 3c will be described. The display-screen generation unit 3c-2 performs a display-screen generation process.

a) Display an image of a leaf node at the center of the leaf node where each leaf node mapped onto the display space includes an image representing the leaf node.

b) Project images positioned in the 3-dimensional space onto a 2-dimensional space to generate a display screen (e.g., a display window) where the images in the 3-dimensional space have been mapped into the 3-dimensional space through the display-space generation process. When the tree structure is directly mapped Onto a 2-dimensional space by the display-space generation process, there is no need to project a 3-dimensional space onto a 2-dimensional space, and the original 2-dimensional space is used as a display screen.

The display screen generated as described above is output to the monitor 6 via the interface unit 5.

Figure 7:
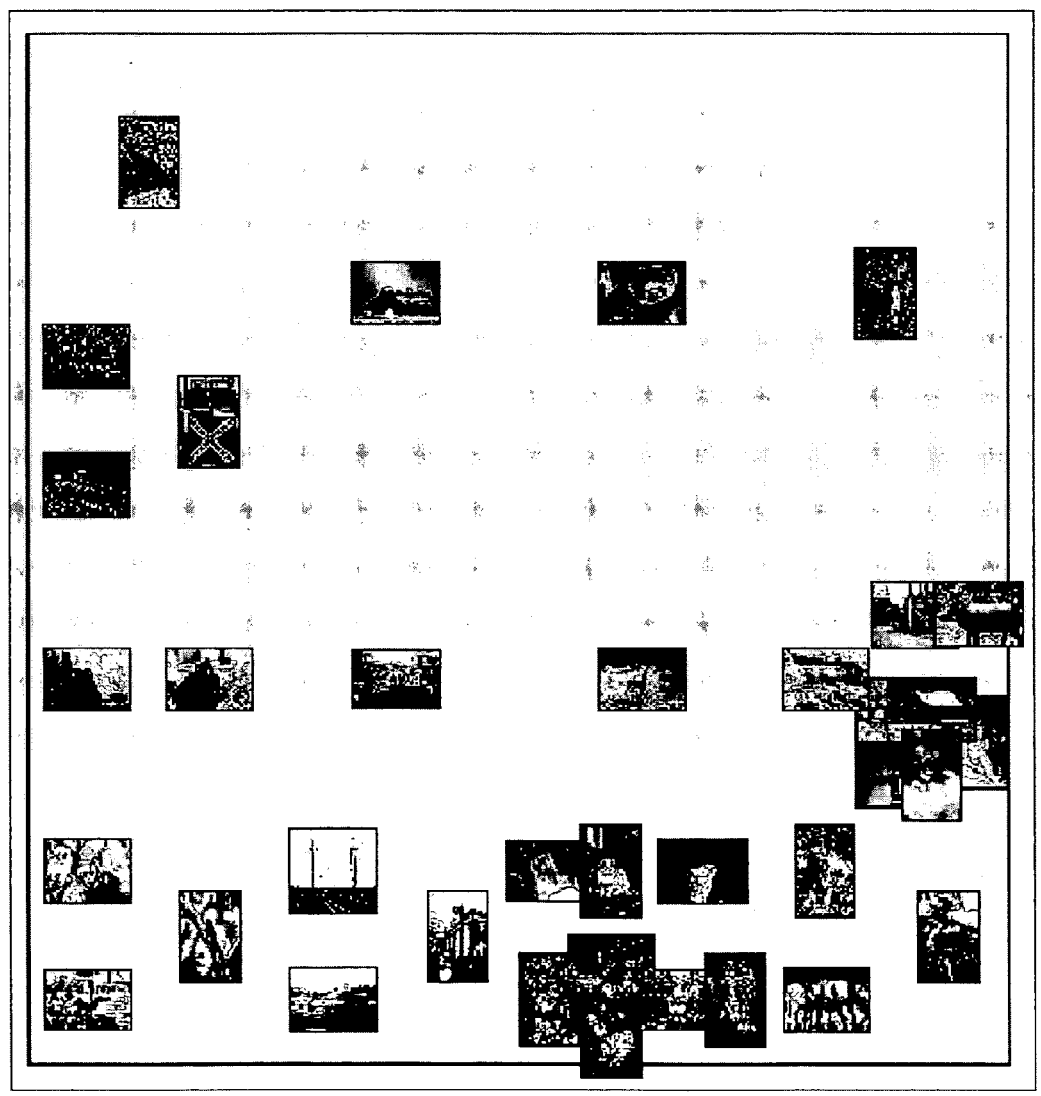
FIG. 7 is an illustrative drawing showing an example of a display screen onto which images are mapped according to the present invention.

FIG. 7 is an illustrative drawing showing an example of a display screen onto which images are mapped according to the present invention.

As shown in FIG. 7, images resembling each other are presented as size-reduced images scattered in the display screen. The stronger the resemblance between images is, the closer the images are, so that the images are presented as being related to each other in a visually organized manner. To this end, as described above, the feature extraction unit 3a, the feature-space tree-structure extraction unit 3b, and the image display processing unit 3c are implemented as application programs, which causes a computer to perform a resembling image display method.

In FIG. 7, thumbnail images that are displayed on the screen may be of any one of the standard file formats, and is not limited to images of a particular file format. Here, the standard file formats refer to formats that store image data that are identified as BMP, GIF, JPEG, etc.

In the embodiment described above, the display-space generation process of the image display processing unit 3c divides the display space evenly into sub-spaces as many as there are nodes. The present invention is not limited to such even division of the display space, and the display space may be divided into sub-spaces of different sizes in proportion to cluster radii of the nodes (clusters), the numbers of features included in the nodes, etc.

Figure 8A:
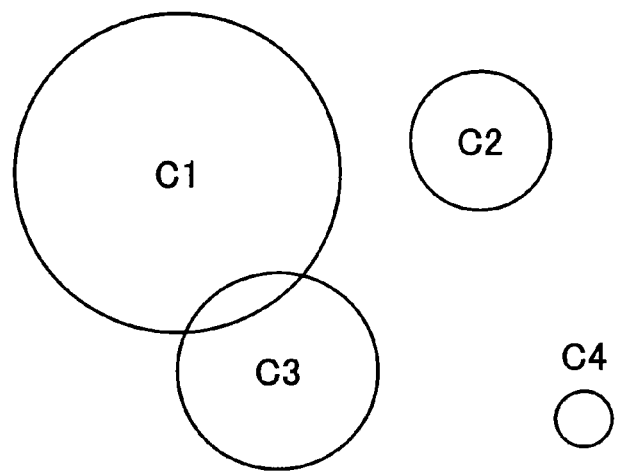
FIGS. 8A and 8B are illustrative drawings showing uneven division of a display space.
Figure 8B:
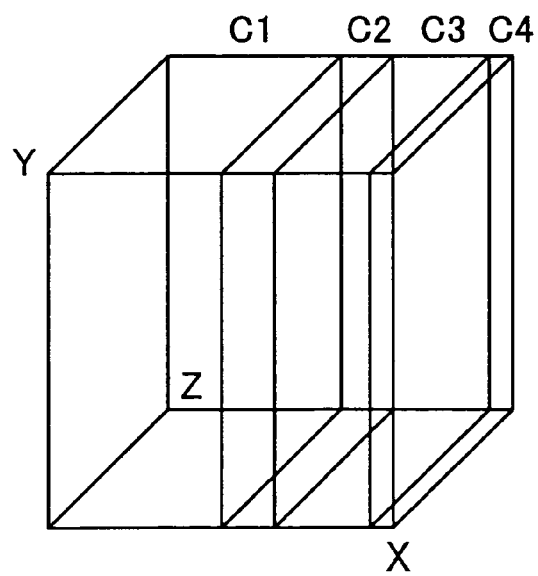

FIGS. 8A and 8B are illustrative drawings showing uneven division of a display space.

As shown in FIG. 8A, nodes (clusters) C1, C2, C3, and C4 have different radii. In such a case, as shown in FIG. 8B, the display space is unevenly divided into sub-spaces having different sizes commensurate with the radii of the nodes. This results in generation of a display screen that represents similarities more accurately. By the same token, if the numbers of features are different from cluster to cluster, divided sub-spaces may be given respective sizes proportional to the numbers of features. This ensures that images are distributed over the display space rather homogeneously, thereby preventing images from crowding a space and making it difficult to see the images.

Figure 9A:
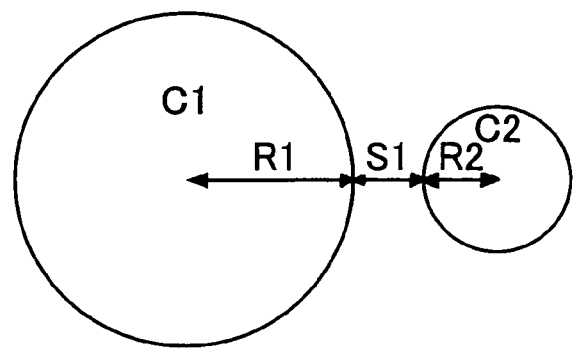
FIGS. 9A and 9B are illustrative drawings showing another example of uneven division of a display space.
Figure 9B:
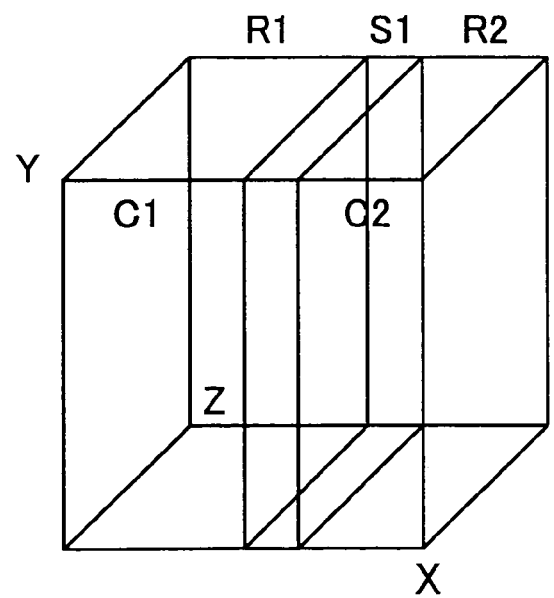

FIGS. 9A and 9B are illustrative drawings showing another example of uneven division of a display space.

In FIG. 9A, clusters C1 and C2 are sibling nodes, and are separated by a gap S1. As shown in FIG. 9B, a display space is divided by providing a gap S1 between the clusters, and no node is assigned to the space of the gap S1. Further, the sub-spaces corresponding the clusters have sizes commensurate with the respective radii R1 and R2. Such an arrangement can generate a display screen that represents image similarities more accurately.

In the embodiment described above, the display-space generation process of the image display processing unit 3c selects only one dimension of the display space, and divides the display space in the direction of the selected dimension. The present invention is not limited to such an arrangement.

Figure 10A:
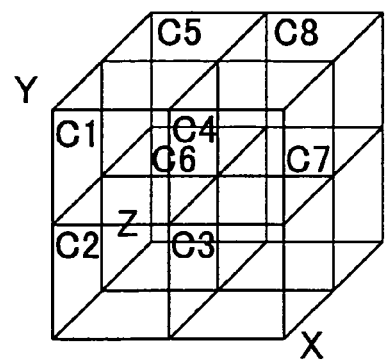
FIGS. 10A through 10C are illustrative drawings showing multi-dimensional division of the display space.
Figure 10B:
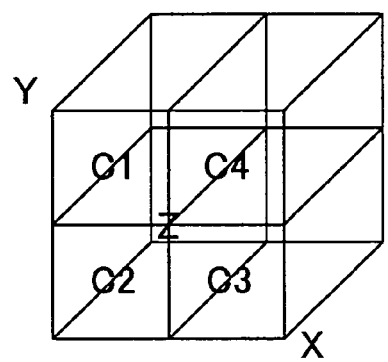
Figure 10C:
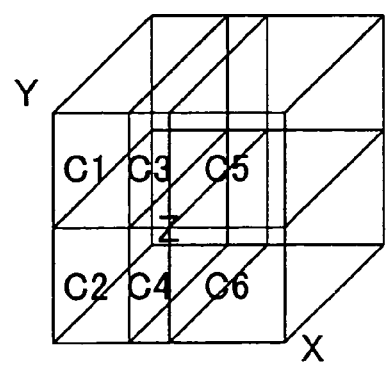

FIGS. 10A through 10C are illustrative drawings showing multi-dimensional division of the display space.

As shown FIG. 10A, the display space may be divided in the three directions of the display space. Alternatively, the display space may be divided in two directions of the display space as shown in FIG. 10B, or may be divided in two directions of the display space with the divided sub-spaces having different sizes as shown in FIG. 10C.

Figure 11:
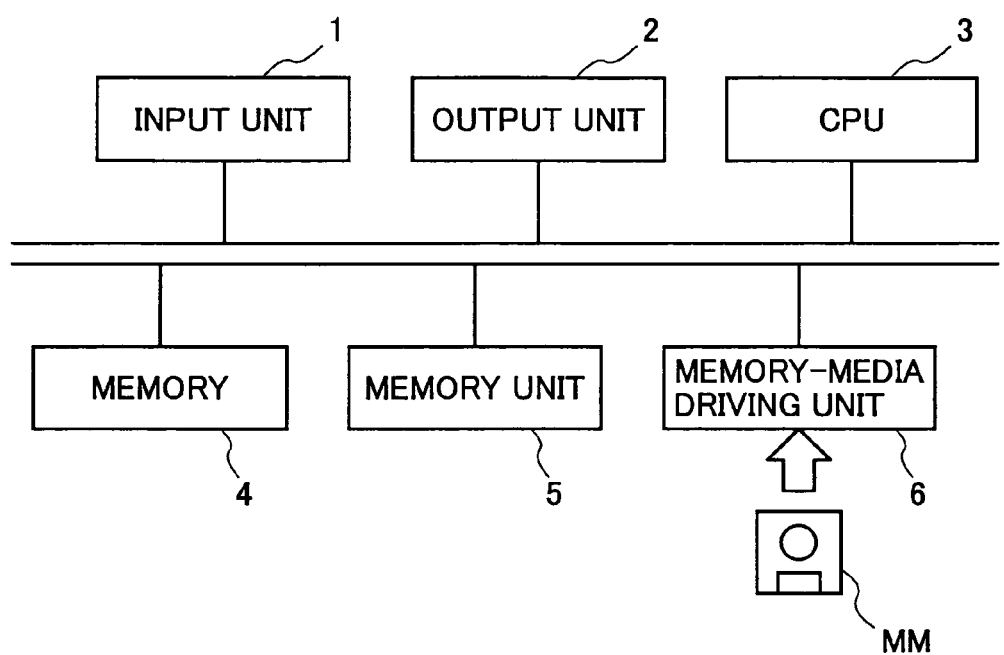
FIG. 11 is a block diagram showing a configuration of a computer for implementing the present invention.

FIG. 11 is a block diagram showing a configuration of a computer for implementing the present invention.

An input unit 101 is comprised of a keyboard, a mouse, a touch panel, etc., and is used for entering information. An output unit 102 outputs various output information and information entered by using the input unit 101, and is comprised of a display device, a printer, or the like. A CPU 103 executes various programs. A memory 104 includes RAMs and ROMs. The memory 104 stores therein the programs, and, also, serves as a temporal storage to store information generated during execution of the programs. A memory unit 105 includes a hard-drive unit or the like serving as a secondary memory storage, and stores therein the programs, data, information generated during program execution, etc. A memory-media driving unit 106 has a memory medium MM mounted therein for recording programs and data, and reads the programs and data from the memory medium to supply them to the memory 104 and/or the memory unit 105. The memory-media driving unit 106 may also be used as a temporal storage for data input/output and/or for providing memory space for execution of the programs.

In such a computer configuration, functions shown in FIG. 1 are implemented as program codes, and are recorded in the memory medium MM such as a CD-ROM. The memory medium MM is then mounted in the memory-media driving unit 106, and the program codes are loaded into the computer to carry out various functions of the present invention.

The memory medium MM may be a semiconductor medium such as a ROM, an IC memory card, etc., an optical medium such as a DVD-ROM, an MO, an MD, a CD-R, etc., or a magnetic medium such as a magnetic tape, a flexible disc, etc.

Further, the programs for implementing the functions of the present invention may be provided via a communication medium rather than via a memory medium.

Moreover, the present invention has been described with reference to presentation of image data. It should be noted, however, that the present invention is applicable to presentation of document data, for example, as long as similarity can be measured based on features.

Further, the present invention is not limited to these embodiments, but various variations and modifications may be made without departing from the scope of the present invention.

The present application is based on Japanese priority application No. 11-120946 filed on Apr. 28, 1999 with the Japanese Patent Office, the entire contents of which are hereby incorporated by reference.

What is claimed is:

1. A method of displaying images that resemble each other, comprising the steps of:
    extracting image features from images;
    dividing a feature space of the image features into sub-spaces having a hierarchical structure;
    generating a tree structure having the sub-spaces as nodes thereof;
    dividing a display space into a plurality of divided spaces corresponding to the respective sub-spaces by taking into account the tree structure; and
    displaying the images in the plurality of divided spaces of the display space, such that any given one of the images displayed in one of the divided spaces of the display space belongs to one of the sub-spaces that corresponds to said one of the divided spaces of the display space.

2. The method as claimed in claim 1, wherein said step of dividing a feature space includes a step of generating clusters having a circle shape by applying a clustering method recursively.

3. The method as claimed in claim 2, wherein said clustering method includes the steps of:
    obtaining a distance between an image feature and one of the clusters closest to the image feature with respect to each one of the image features;
    selecting an image feature successively from the image features in an ascending order of the distance;
    obtaining an increase in a radius of each cluster such that said each cluster contains the selected image feature; and
    making the selected image feature belong to a cluster that has the smallest radius increase.

4. The method as claimed in claim 1, wherein said step of dividing the display space includes the steps of:
    a) dividing the display space in a direction of a selected dimension, selected for a given node of the tree structure, into divided spaces as many as there are nodes immediately under the given node in the tree structure; and
    b) repeating said step a) by changing the selected dimension as a new node is selected as the given node from a next node level.

5. The method as claimed in claim 4, wherein said step a) further provides extra spaces between the divided spaces such that the extra spaces represent gaps between the nodes.

6. The method as claimed in claim 4, wherein said step a) divides the display space such that the divided spaces corresponding to the respective nodes have sizes proportional to numbers of image features belonging to the respective nodes.

7. The method as claimed in claim 4, wherein said step a) divides the display space such that the divided spaces corresponding to the respective nodes have sizes proportional to sizes of the sub-spaces corresponding to the respective nodes.

8. The method as claimed in claim 4, further comprising a step of adjusting sizes of the divided spaces such that the sizes of the divided spaces corresponding to the respective nodes reflect numbers of image features belonging to the respective nodes and sizes of the sub-spaces corresponding to the respective nodes.

9. A computer-readable medium having a program embodied therein for causing a computer to create a display screen image for displaying images that resemble each other, said program comprising:
    a program code for extracting image features from images;
    a program code for dividing a feature space of the image features into sub-spaces having a hierarchical structure;
    a program code for generating a tree structure having the sub-spaces as nodes thereof;
    a program code for dividing a display space into a plurality of divided spaces corresponding to the respective sub-spaces by taking into account the tree structure; and
    a program code for displaying the images in the plurality of divided spaces of the display space, such that any given one of the images displayed in one of the divided spaces of the display space belongs to one of the sub-spaces that corresponds to said one of the divided spaces of the display space.

10. The computer-readable medium as claimed in claim 9, wherein said program code for dividing a feature space includes a program code for generating clusters having a circle shape by applying a clustering method recursively.

11. The computer-readable medium as claimed in claim 10, wherein said clustering method includes the steps of:
    obtaining a distance between an image feature and one of the clusters closest to the image feature with respect to each one of the image features;
    selecting an image feature successively from the image features in an ascending order of the distance;
    obtaining an increase in a radius of each cluster such that said each cluster contains the selected image feature; and
    making the selected image feature belong to a cluster that has the smallest radius increase.

12. The computer-readable medium as claimed in claim 9, wherein said program code for dividing the display space includes:
    a dividing program code for dividing the display space in a direction of a selected dimension selected for a given node of the tree structure into divided spaces as many as there are nodes immediately under the given node in the tree structure; and
    a repeating program code for causing said dividing program code to repeat processing thereof by changing the selected dimension as a new node is selected as the given node from a next node level.

13. The computer-readable medium as claimed in claim 12, wherein said dividing program code further provides extra spaces between the divided spaces such that the extra spaces represent gaps between the nodes.

14. The computer-readable medium as claimed in claim 12, wherein said dividing program code divides the display space such that the divided spaces corresponding to the respective nodes have sizes proportional to numbers of image features belonging to the respective nodes.

15. The computer-readable medium as claimed in claim 12, wherein said dividing program code divides the display space such that the divided spaces corresponding to the respective nodes have sizes proportional to sizes of the sub-spaces corresponding to the respective nodes.

16. The computer-readable medium as claimed in claim 12, further comprising a program code for adjusting sizes of the divided spaces such that the sizes of the divided spaces corresponding to the respective nodes reflect numbers of image features belonging to the respective nodes and sizes of the sub-spaces corresponding to the respective nodes.

17. A device for displaying images that resemble each other, comprising:
- a memory which stores therein a program; and
- a CPU which executes the program, wherein said CPU executing the program performs the steps of:
- extracting image features from images;
- dividing a feature space of the image features into sub-spaces having a hierarchical structure;
- generating a tree structure having the sub-spaces as nodes thereof;
- dividing a display space into a plurality of divided spaces corresponding to the respective sub-spaces by taking into account the tree structure; and
- displaying the images in the plurality of divided spaces of the display space, such that any given one of the images displayed in one of the divided spaces of the display space belongs to one of the sub-spaces that corresponds to said one of the divided spaces of the display space.

18. A computer-readable medium having a program embodied therein for causing a computer to create a display screen image for displaying items that resemble each other, said program comprising:
- a program code for extracting item features from items;
- a program code for dividing a feature space of the item features into sub-spaces having a hierarchical structure;
- a program code for generating a tree structure having the sub-spaces as nodes thereof;
- a program code for dividing a display space into a plurality of divided spaces corresponding to the respective sub-spaces by taking into account the tree structure; and
- a program code for displaying the items in the plurality of divided spaces of the display space, such that any given one of the items displayed in one of the divided spaces of the display space belongs to one of the sub-spaces that corresponds to said one of the divided spaces of the display space.

* * * * *